United States Patent
Niwa (10) Patent No.: US 9,332,378 B2
(45) Date of Patent: *May 3, 2016

(54) WIRELESS COMMUNICATION DEVICE FOR PERFORMING DIFFERENT WIRELESS COMMUNICATIONS

(71) Applicant: SEIKO EPSON CORPORATION, Tokyo (JP)

(72) Inventor: Takamasa Niwa, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/807,159

(22) Filed: Jul. 23, 2015

(65) Prior Publication Data

US 2015/0327005 A1 Nov. 12, 2015

Related U.S. Application Data

(63) Continuation of application No. 13/760,636, filed on Feb. 6, 2013, now Pat. No. 9,137,851.

(30) Foreign Application Priority Data

Feb. 7, 2012 (JP) .................................. 2012-023853

(51) Int. Cl.
*H04W 4/00* (2009.01)
*H04W 88/06* (2009.01)
*H04W 76/02* (2009.01)
*H04W 72/04* (2009.01)
(Continued)

(52) U.S. Cl.
CPC ............. *H04W 4/008* (2013.01); *H04L 13/182* (2013.01); *H04W 72/048* (2013.01); *H04W 76/021* (2013.01); *H04W 76/043* (2013.01); *H04W 88/06* (2013.01)

(58) Field of Classification Search
CPC ..... H04W 36/00; H04W 36/08; H04W 36/14; H04W 36/34; H04W 36/36; H04B 1/005; H04B 1/006; H04B 1/0064
See application file for complete search history.

(56) References Cited

U.S. PATENT DOCUMENTS

| 6,957,068 | B2 * | 10/2005 | Hutchison, IV | ...... H04W 88/06 370/331 |
|---|---|---|---|---|
| 2008/0182615 | A1 * | 7/2008 | Xue | ...................... H04W 48/16 455/552.1 |
| 2008/0261640 | A1 | 10/2008 | Yoshida | |

(Continued)

FOREIGN PATENT DOCUMENTS

| JP | 2005-303821 A | 10/2005 |
|---|---|---|
| JP | 2008-211638 A | 9/2008 |

(Continued)

*Primary Examiner* — Chi H Pham
*Assistant Examiner* — Weibin Huang
(74) *Attorney, Agent, or Firm* — Global IP Counselors, LLP (57) ABSTRACT

A wireless communication device includes a memory unit that stores a communication setting information, and a communication control unit that controls a wireless communication in accordance with the communication setting information. When the first wireless communication switches to the second wireless communication, the communication control unit keeps the communication setting information of the first wireless communication being stored. After that, when the second wireless communication is turned off, the communication control unit controls the first wireless communication in accordance with the communication setting information of the first wireless communication.

10 Claims, 4 Drawing Sheets

(51) Int. Cl.
*H04L 13/18* (2006.01)
*H04W 76/04* (2009.01)

(56) References Cited

U.S. PATENT DOCUMENTS

2009/0104907 A1* 4/2009 Otting ................ H04W 48/10
                                                        455/435.3
2009/0280812 A1* 11/2009 Cheng ................ H04W 76/046
                                                        455/436
2011/0194489 A1    8/2011  Itaya et al.
2011/0268027 A1   11/2011  Nogawa
2014/0287695 A1    9/2014  Nogawa

FOREIGN PATENT DOCUMENTS

| JP | 2010-093430 A | 4/2010 |
| JP | 2011-166417 A | 8/2011 |
| JP | 2011-234205 A | 11/2011 |

* cited by examiner

WIRELESS COMMUNICATION DEVICE FOR PERFORMING DIFFERENT WIRELESS COMMUNICATIONS

CROSS-REFERENCE TO RELATED APPLICATIONS

This application is a continuation application of U.S. patent application Ser. No. 13/760,636 filed on Feb. 6, 2013. This application claims priority to Japanese Patent Application No. 2012-023853 filed on Feb. 7, 2012. The entire disclosures of U.S. patent application Ser. No. 13/760,636 and Japanese Patent Application No. 2012-023853 are hereby incorporated herein by reference.

BACKGROUND

1. Technical Field

The present invention relates to a wireless communication device.

2. Background Technology

As a method for establishing a network, there is a method for performing Wi-Fi Direct (hereinafter referred to as "Wi-Fi Direct Connection") under Wi-Fi Alliance standard development. A wireless communication device that is possible to perform the Wi-Fi Direct Connection can directly communicate with other wireless communication devices that are also possible to perform the Wi-Fi Direct Connection as one-on-one communication or a multiple devices communication without using an access point. Also, it is possible to communicate with a wireless communication device that is possible to perform a wireless LAN connection method used with Wi-Fi (hereinafter referred to as "Wi-Fi Connection") function as an access point. In addition, since the Wi-Fi Direct Connection uses the Wi-Fi technologies, the high-speed communication is possible. By using the Wi-Fi Direct Connection, for example, it is possible to directly send an image to a printer from a camera or a cellular phone and print it out.

Japanese Laid-open Patent Publication No. 2011-166417 (Patent Document 1) and http://205.149.128.22/Wi-Fi_Direct.php (Non-patent Document 1) are examples of the related art.

SUMMARY

In a wireless communication device such as a printer, because of the reasons such that the load is increased on the CPU when the plurality of networks are simultaneously connected or the allocation number of the MAC address is limited, the number of the possible network connections at the same time is limited, and for example, it can be connected by only a single network. In the wireless communication device that only connects to the single network at the same time and is possible for the Wi-Fi Direct Connection, the user switches the Wi-Fi Direct Connection from a network connected by the Wi-Fi Connection through an access point. When it establishes a network with another wireless communication device that is possible for the Wi-Fi Direct Connection, the network, which was connected by the Wi-Fi Connection before switching, cannot be used. And, to reconnect the network, which was connected by the Wi-Fi Connection before switching, the user needs to be resetting the communication setting information of the network, which was connected by the Wi-Fi Connection before switching, after the end of the Wi-Fi Direct in the wireless communication device. Normally, the Wi-Fi Direct Connection is used temporary so that it is hard for the user that the network has to be reset every time the Wi-Fi Direct Connection is end.

Therefore, the advantage of the invention is to provide a wireless communication device having an easy resetting control or without any resetting control to switch the network, which was connected before starting the Wi-Fi Direct Connection, after the end of the Wi-Fi Direct Connection.

A wireless communication device according to one aspect performs a wireless communication with other wireless communication devices. The wireless communication device includes a memory unit and a communication control unit. The memory unit stores a communication setting information used for the wireless communication. The communication control unit controls the wireless communication in accordance with the communication setting information stored in the memory unit so as to control a first wireless communication and a second wireless communication. The communication control unit controls the first wireless communication in accordance with the communication setting information of the first wireless communication stored in the memory unit. When the first wireless communication switches to the second wireless communication, the communication setting information of the first wireless communication is kept stored in the memory unit, the communication setting information of the second wireless communication is added in the memory unit and the communication control unit controls the second wireless communication in accordance with the communication setting information of the second wireless communication stored in the memory unit. When the second wireless communication is turned off, the communication control unit controls the first wireless communication in accordance with the communication setting information of the first wireless communication kept storing in the memory unit. The first wireless communication performs a wireless communication with the other wireless communication devices through an external access point. The second wireless communication performs a peer-to-peer wireless communication with the other wireless communication devices through without the external access point.

According to the first aspect of the wireless communication device, after the end of the Wi-Fi-Direct Connection, it can switch to the network, which was connected before starting the Wi-Fi Direct Connection, without any resetting control.

BRIEF DESCRIPTION OF THE DRAWINGS

Referring now to the attached drawings which form a part of this original disclosure.

DETAILED DESCRIPTION OF EXEMPLARY EMBODIMENTS

Hereinafter, the embodiments of the invention will be explained with reference to the drawings.

Figure 1:
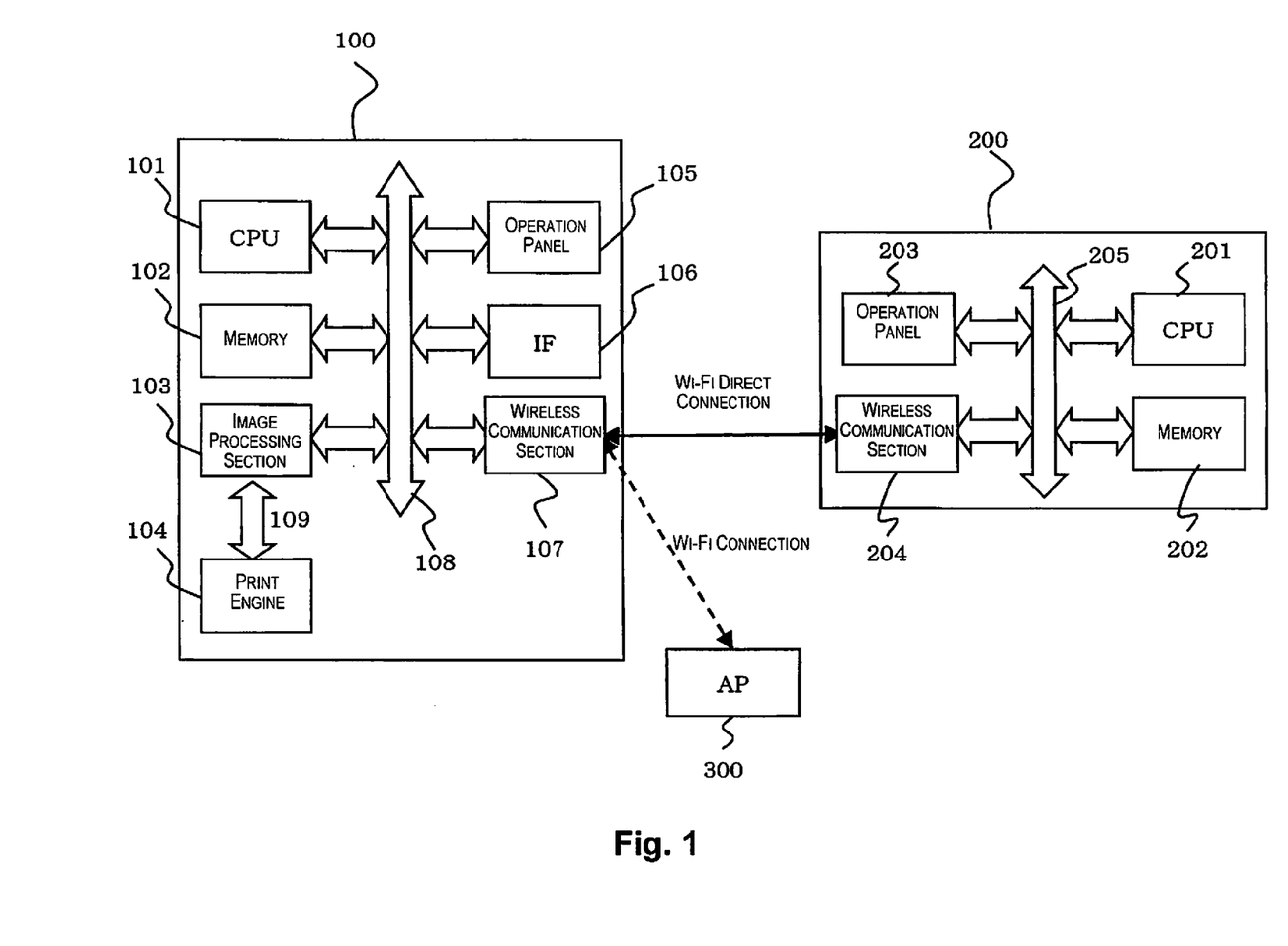
FIG. 1 shows a wireless communication system according to the present embodiment.

FIG. 1 shows a wireless communication system according to the present embodiment. The present system has a printer 100, a mobile terminal 200, and an access point 300. The printer 100 is a wireless communication device that can only connect to a single network simultaneously. Also, in addition to the Wi-Fi Connection, it is possible that the printer 100 can be connected with the mobile terminal 200 by the Wi-Fi Direct Connection so that either one of the Wi-Fi Direct Connection or the Wi-Fi Connection can be used for performing the wireless communication.

In the present embodiment, the communication setting information is preliminary set so that the printer 100 performs a communication with the access point 300 by a wireless LAN. The Wi-Fi Connection network is established between the printer 100 and the access point 300. By the way, in this time, the mobile terminal 200 can be either connected or not connected to the network.

Also, to perform a direct communication between the printer 100 and the mobile terminal 200, the user controls the printer 100 and the mobile terminal 200 at any timing so that the Wi-Fi Direct Connection can start.

When the Wi-Fi Direct Connection is started, the Wi-Fi Direct Connection network is established between the printer 100 and the mobile terminal 200 by the network switching process as described later. In addition, when either one of the printer 100 or the mobile terminal 200 turned off the Wi-Fi Direct Connection network, without controlling the printer 100 by the user, the network before switching to the Wi-Fi Direct Connection, that is, the Wi-Fi Connection network between the printer 100 and the access point 200 is reestablished. As examples that the network is turned off, it can be in a case that the user controls either one of the printer 100 or the mobile terminal 200 to invalidate the Wi-Fi Direct Connection, in a case that the mobile terminal 200 cannot receive a signal from the printer 100 and the mobile terminal 200 becomes out of a service area, in a case that the printer 100 cannot receive a signal from the mobile terminal 200 and the mobile terminal 200 becomes out of a service area, or the like.

Because of this, even when the printer 100, which preliminary sets the communication setting information of the Wi-Fi Connection network, temporally connects to the Wi-Fi Direct Connection, the previous network can be used without resetting after the end of the Wi-Fi Direct Connection. Normally, the Wi-Fi Direct Connection is temporally used and the frequency of its usage is low so that it has an advantage for the user because the resetting control does not have to be performed every time the Wi-Fi Direct Connection is end.

In addition, it takes time to reestablish the previous network before the Wi-Fi Direct Connection when an inexperienced user controls the resetting. However, in the present embodiment, by the network switching process as described later, the user can use the previous network again without any setting control after the end of the Wi-Fi Direct Connection.

Printer 100

The printer 100 includes a CUP 101, a non-volatile memory 102, an image processing section 103, a print engine 104, an operation panel 105, an interface 106, a wireless communication section 107, and buses 108, 109.

The CPU 101 executes various programs such as a communication control program or a print control program stored in the non-volatile memory 102, and a network switching process program as described later so that it controls the respective devices in the printer 100. Besides the various programs, the non-volatile memory 102 stores a data such as a communication setting information as described later.

The operation panel 105 has a LCD or a touch panel, and displays various messages. The operation panel receives instructions from the user. When the Wi-Fi Direct validation button displayed in the operation panel 105 is pressed, the Wi-Fi Direct Connection is validated and it starts the network switching process as described later. Also, a device list, which is produced during the Wi-Fi Direct switching process, is displayed in the operation panel 105, and the user can select a destination device for the Wi-Fi Direct Connection communication from the device list. In addition, when the Wi-Fi Direct invalidation button displayed in the operation panel 105 is pressed, the Wi-Fi Direct Connection is invalidated and the established Wi-Fi Direct Connection network is turned off.

The interface 106 connects an external device such as a personal computer, which is not shown in the drawings, through a LAN cable. The wireless communication section 107 performs a Wi-Fi Direct Connection communication with the mobile terminal 200 or it performs a Wi-Fi Connection communication with the access point 300 by the Wi-Fi Connection.

The image processing section 103 receives an image data through the interface 106 or the wireless communication section 107 and produces a print data by the image processing. Also, the print engine 104 connected with the image processing section 103 through the bus 109 prints an image based on the print data.

Mobile Terminal 200

The mobile terminal 200 includes a CPU 201 that executes various programs such as a communication operation program and operates respective equipment in the mobile terminal, a non-volatile memory 202 that stores various programs and data, an operation panel 203 that displays a message and receives an operation from the user, a wireless communication section 204 that performs a communication in one of the Wi-Fi Direct Connection and the Wi-Fi Connection, and a bus 205.

The operation panel 203 displays a Wi-Fi Direct validation button and a Wi-Fi Direct invalidation button. When the Wi-Fi Direct validation button is pressed, it validates the Wi-Fi Direct Connection so that the Wi-Fi Direct Connection network is established with another wireless communication device such as the printer 100 which is possible for the Wi-Fi Direct Connection. Also, when the Wi-Fi Direct invalidation button displayed in the operation panel 203 is pressed, it invalidates the Wi-Fi Direct Connection so that the established Wi-Fi Direct Connection network is turned off.

Because of this, in the present embodiment, by pressing the Wi-Fi Direct validation button and invalidation button in either one of the printer 100 and the mobile terminal 200, the user can start establishing the Wi-Fi Direct Connection network or the user can turn off the Wi-Fi Direct Connection network.

Network Switching Process

Figure 2:
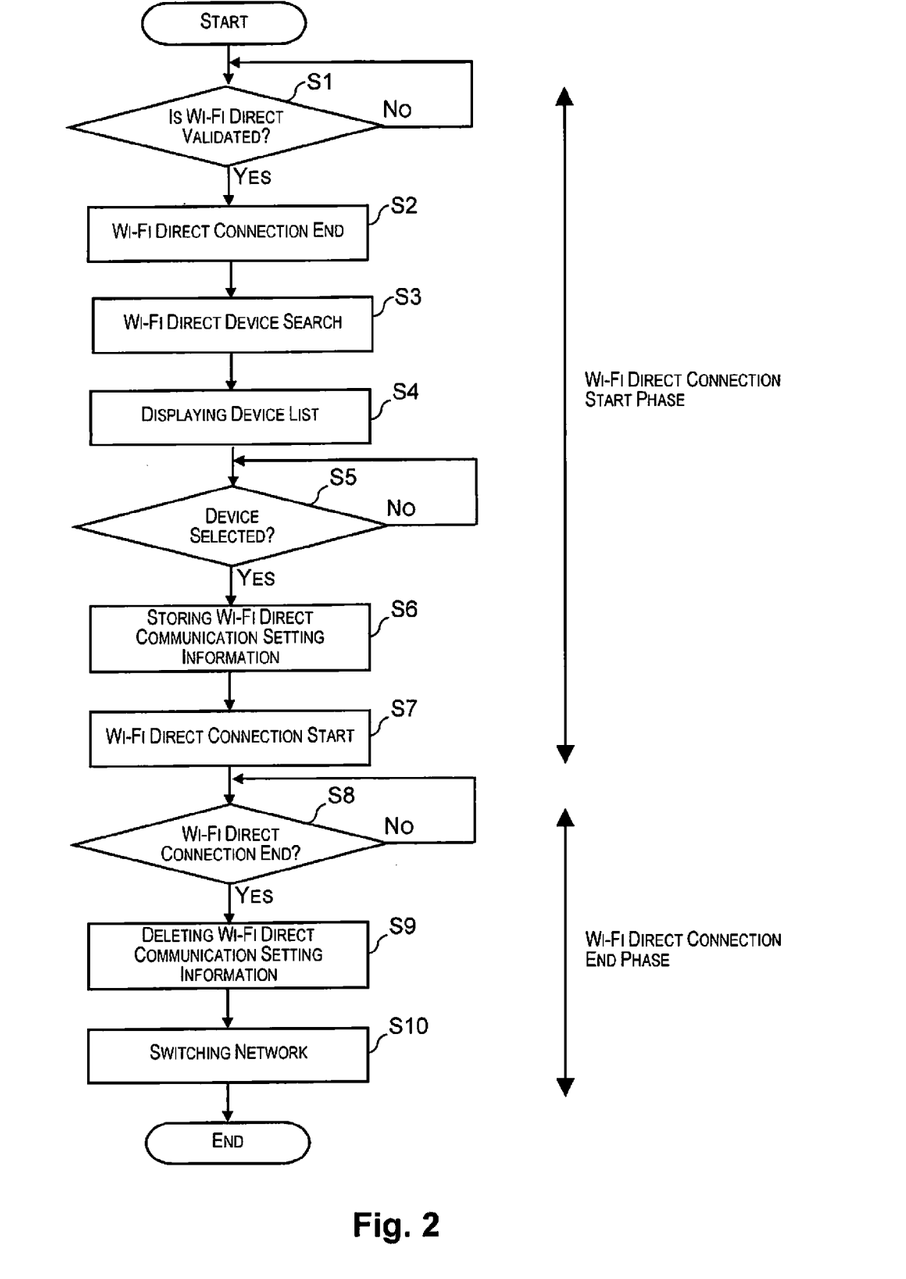
FIG. 2 is a flowchart of a network switching process according to the present embodiment.
Figure 3:
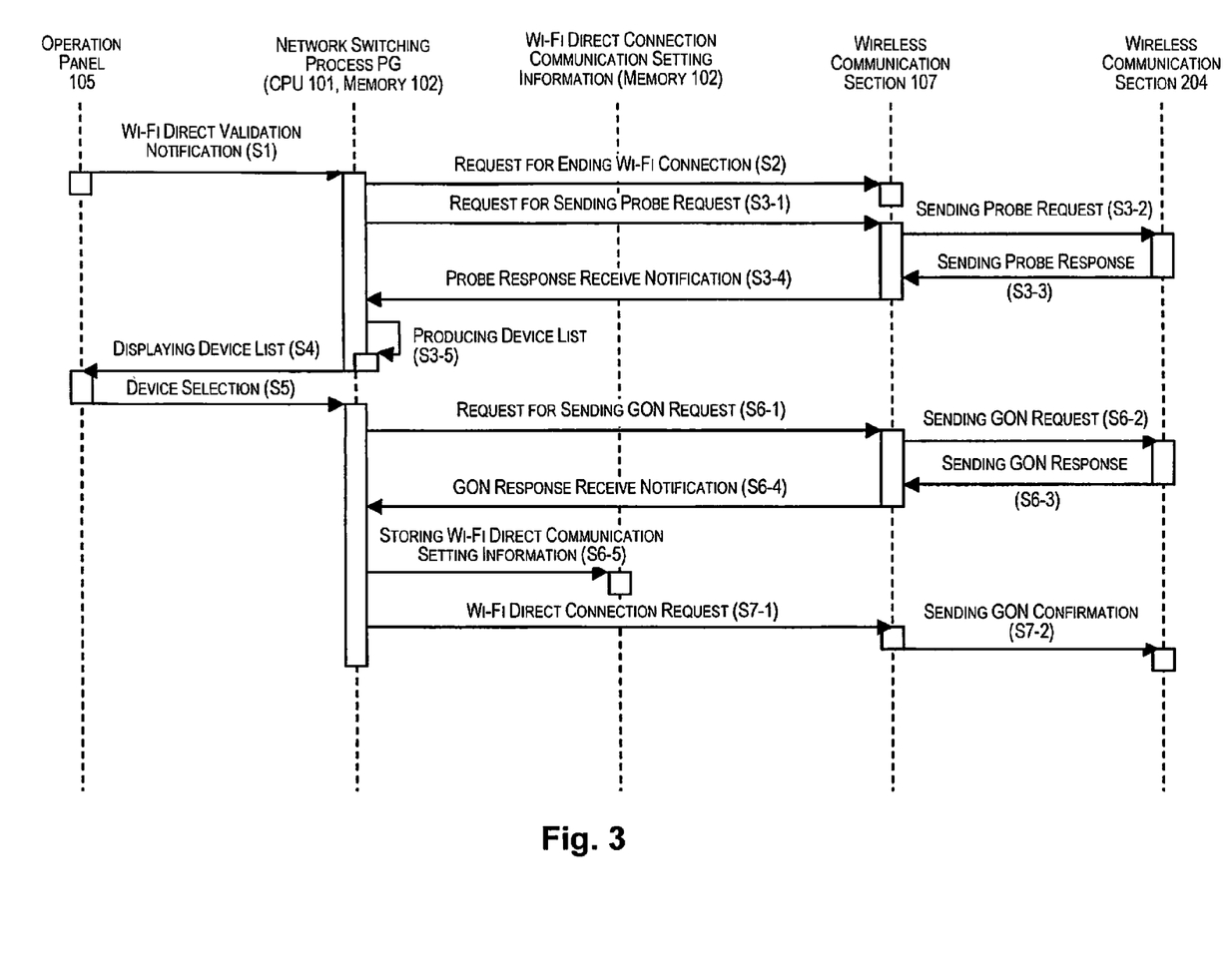
FIG. 3 is a sequence diagram of a Wi-Fi Direct Connection start phase according to the present embodiment.
Figure 4:
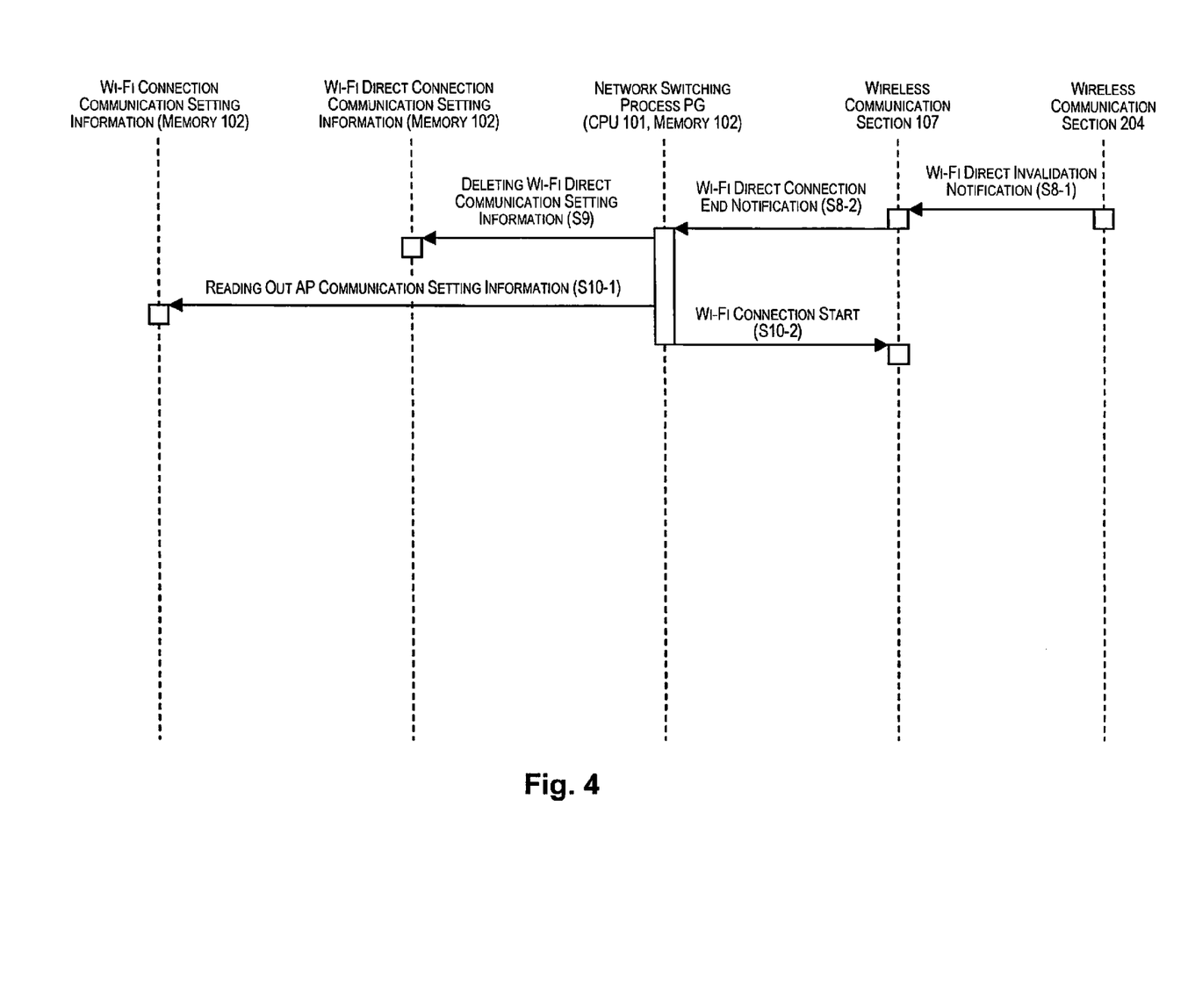
FIG. 4 is a sequence diagram of a Wi-Fi Direct Connection end phase according to the present embodiment.

FIGS. 2 to 4 show a concrete example of the network switching process in the present embodiment. FIG. 2 is a flowchart of the network switching process in the present embodiment.

The network switching process constitutes Steps S1 to S10 as shown in FIG. 2. Steps S1 to S7 are the Wi-Fi Direct Connection start phase, and Steps S8 to S10 are the Wi-Fi Direct Connection end phase. FIGS. 3 and 4 show the concrete processes of the respective phases.

FIG. 3 is a sequence diagram of a Wi-Fi Direct Connection start phase according to the present embodiment. FIG. 4 is a sequence diagram of a Wi-Fi Direct Connection end phase according to the present embodiment.

In the process of FIGS. 2 to 4, before starting the network switching process of Steps S1 to S10, the Wi-Fi Connection network of an infrastructure mode between the printer 100 and the access point 300 is preliminary established as shown in FIG. 1. That is, the non-volatile memory 102 preliminary stores the communication setting information (hereinafter referred to as "Wi-Fi Connection communication setting information"), which is necessary for the Wi-Fi Connection communication with the access point 300, such as, for example, an IP address of the access point 300, a Service Set Identifier (SSID), and a password.

Also, the Wi-Fi Direct validation button has been preliminary pressed by the user so that the Wi-Fi Direct Connection is validated.

And, the CPU 101 executes the network switching process program in the non-volatile memory 102 under the above description and performs the network switching process (S1 to S10) as described below.

Wi-Fi Direct Connection Start Phase

As described above, when the Wi-Fi Direct validation button of the operation panel 105 is pressed by the user, the network switching process starts. Specifically, when the Wi-Fi Direct validation button of the operation panel 105 is pressed by the user, the CPU 101 is notified that the Wi-Fi Direct Connection is validated (S1), and it executes Step S2.

In Step S2, the CPU 101 requests to end the Wi-Fi Connection communication to the wireless communication section 107 (S2). And, in response to the request, the wireless communication part 107 turns off the Wi-Fi Connection network between the printer 100 and the access point 300. In this time, the Wi-Fi Connection setting information stored in the non-volatile memory 102 is not deleted and it stores in the non-volatile memory 102.

After Step S2, it searches a wireless communication device that validates the Wi-Fi Direct Connection in a communication range of the printer 100. Specifically, the CPU 101 requests the wireless communication section 107 to send a probe request (S3-1). And, the wireless communication section 107 sends the probe request in response to the request (S3-2). In this time, the probe request includes the device identification information such as a MAC address of the printer 100, a device name, and a device type.

When the wireless communication section 204 of the mobile terminal 200 receives the probe request that was sent from the wireless communication section 107 of the printer 100, the wireless communication section 204 of the mobile terminal 200 that validates the Wi-Fi Direct Connection sends a probe response to the wireless communication section 107 (S3-3). The probe response includes the device identification information such as a MAC address of the mobile terminal 200, a device name, and a device type. And, the CPU 101 the CPU 101 receives the probe response of the mobile terminal 200 through the wireless communication section 107. In this time, if there are other wireless devices that validate the Wi-Fi Direct Connection other than the mobile terminal 200, in the same manner, it also performs sending a probe request and receiving a probe response for other wireless communication devices.

And, the CPU 101 produces a device list based on the received probe responses (S3-5). The device list is a list of the wireless communication devices that validate the Wi-Fi Direct Connection existed in a communication range of the printer 100.

After producing the device list, the CPU 101 displays the device list in the operation panel (S4). The user controls the operation panel and selects the mobile terminal 200 as a destination for the Wi-Fi Direct Connection communication in the device list. And, the operation panel 105 notifies that the mobile terminal 200 was selected (S5).

When the mobile terminal 200 is selected in the device list, the CPU 101 stores the communication setting information to perform the Wi-Fi Direct Connection communication with the mobile terminal 200 in the non-volatile memory 102 (S6). First, the CPU 101 requests the wireless communication section 107 to send a Group Owner Negotiation (hereinafter referred to as "GON") request as a connection request to the mobile terminal 200 (S6-1). And, in response to the request, the wireless communication section 107 sends the GON request to the wireless communication section 204 of the mobile terminal 200 (S6-2).

When the wireless communication section 204 of the wireless terminal 200 receives the GON request, by the CPU 201, the operation panel 203 displays a message that the connection was requested from the printer 100. And, when the user controls the operation panel 203 to permit the connection with the printer 100, the GON response to notify the connection permission is sent to the wireless communication section 107 of the printer 100 through the wireless communication section 204 of the mobile terminal 200 (S6-3).

When the CPU 101 receives the GON response through the wireless communication section 107 (S6-4), the SSID is produced for the Wi-Fi Direct Connection communication with the mobile terminal 200. The SSID is temporary used for the communication with the mobile terminal 200. That is, after turning off the network with the mobile terminal 200, when the Wi-Fi Direct Connection communication is restarted with the wireless communication devices that validate the Wi-Fi Direct Connection including the mobile terminal 200, another SSD is produced.

And, the CPU 101 stores the communication setting information that is necessary for the Wi-Fi Direct Connection (hereinafter referred to as "Wi-Fi Direct Connection communication setting information") such as a produced SSID, a password, and an IP address in the non-volatile memory 102 (S6-5).

After completing Step 6, the CPU 101 starts the Wi-Fi Direct Connection communication (S7). First, the CPU 101 requests the wireless communication section 107 to send a GON confirmation to notify that the network between the printer 100 and the mobile terminal 200 was established in the wireless layer level (S7-1). And, the GON confirmation sent from the wireless communication section 107 is received to the wireless communication section 204 (S7-2). After that, by Wi-Fi Protected Setup (WPS) method, the CPU 101 performs a security setting between the printer 100 and the mobile terminal 200 so that the Wi-Fi Direct Connection communication becomes possible.

As described above, in the Wi-Fi Direct Connection start phase, the printer 100 stores the Wi-Fi Connection communication setting information in the non-volatile memory 102 after the end of the Wi-Fi Connection communication, and in addition, it stores the Wi-Fi Direct Connection communication setting information in the non-volatile memory 102. And, the printer 100 starts the Wi-Fi Direct Connection based on the Wi-Fi Direct Connection communication setting information.

By the way, the Wi-Fi Connection setting information can be stored in a RAM in the printer 100, which is not shown in the drawing, instead of the non-volatile memory 102. In this case, the Wi-Fi Direct Connection communication of Step S7 starts based on the Wi-Fi Connection communication setting information stored in the RAM.

Wi-Fi Direct Connection End Phase

Once, the Wi-Fi Direct Connection communication has been performed between the printer 100 and the mobile terminal 200, and when the CPU 101 detected that the network with the mobile terminal 200 was turned off, the process after Step 8 as shown in FIG. 4 is performed so that it switches to the previous Wi-Fi Connection network without the setting control by the user.

When the user presses the Wi-Fi Direct invalidation button of the operation panel 203 in the mobile terminal 200, it becomes to invalidate the Wi-Fi Direct Connection and the Wi-Fi Direct Connection communication network is turned off. With that, the wireless communication section 204 of the mobile terminal 200 notifies to the wireless communication section 107 of the printer 100 (S8-1). Because of this, the CPU 101 detects that the Wi-Fi Direct Connection was invalidated through the wireless communication section 107 (S8-2), and the process of Step S9 starts.

In this point, as another method to detect that the network was turned off, it can be a method using a beacon. Specifically, the wireless communication sections 107, 204 of the printer 100 that is possible for the Wi-Fi Direct Connection and the mobile terminal 200 send a beacon from each other at a fixed time interval. And, one side of that sends a response signal in response to the beacon from another side, and one side of that notifies to another side that it is in a range of a service area. Because of this, when the CUP 101 has not been received a beacon or a response signal from the mobile terminal 200 within a predetermined time, it can detect that the network was turned off because the mobile terminal 200 is out of the service area. And, when the CPU 101 detected that the network was turned off, it starts the process of Step S9.

When by Step S8, the CPU 101 detected that the network was turned off, the Wi-Fi Direct Connection Communication setting information is deleted in the non-volatile memory 102 (S9), and the Wi-Fi Connection network by the infrastructure mode between the printer 100 and the access point 300 is reestablished (S10). That is, the CPU 101 starts the communication with the access point 300 through the wireless communication section 107 (S10-2) based on the Wi-Fi Connection communication setting information (S10-1) read from the non-volatile memory 102.

As described above, in the Wi-Fi Direct Connection end phase, the printer 100 deletes the Wi-Fi Direct Connection communication setting information, and the Wi-Fi Connection restarts based on the Wi-Fi Connection communication setting information without the resetting control of the user.

What is claimed is:

1. A wireless communication device that performs a wireless communication with other wireless communication devices comprising:

a memory unit that stores a communication setting information used for the wireless communication; and a communication control unit that controls the wireless communication in accordance with the communication setting information stored in the memory unit so as to control a first wireless communication and a second wireless communication;

wherein the communication control unit controls the first wireless communication in accordance with the communication setting information of the first wireless communication stored in the memory unit, when the first wireless communication switches to the second wireless communication, the communication setting information of the first wireless communication is kept stored in the memory unit, the communication setting information of the second wireless communication is added in the memory unit and the communication control unit controls the second wireless communication in accordance with the communication setting information of the second wireless communication stored in the memory unit, when the second wireless communication is turned off, the communication control unit controls the first wireless communication in accordance with the communication setting information of the first wireless communication kept storing in the memory unit, the first wireless communication performs a wireless communication with the other wireless communication devices through an external access point, and the second wireless communication performs a peer-to-peer wireless communication with the other wireless communication devices through without the external access point.

2. The wireless communication device according to claim 1, wherein when a notification signal to turn off is received from the other wireless communication devices, when a beacon signal has not been received from the other wireless communication devices within a predetermined time, or when a response signal from the other wireless communication devices in response to the beacon signal from the wireless communication device has not been received within a predetermined time, the communication control unit detects that the second wireless communication was turned off.

3. The wireless communication device according to claim 1, wherein the communication setting information of the second wireless communication includes a Service Set Identifier, the communication control unit produces the Service Set Identifier when the first wireless communication switches to the second wireless communication.

4. The wireless communication device according to claim 1, wherein the communication control unit writes the communication setting information of the first wireless communication, when the first wireless communication switches to the second wireless communication, the communication control unit do not delete the communication setting information of the first wireless communication stored in the memory unit, and when the second wireless communication is turned off, the communication control unit reads the communication setting information of the first wireless communication from the memory unit.

5. The wireless communication device according to claim 4, further comprising a wireless communication unit configured to perform the first wireless communication and the second wireless communication, wherein the communication control unit requests the first wireless communication in accordance with the read communication setting information of the first wireless communication.

6. The wireless communication device according to claim 1, wherein the communication control unit controls to commence the first wireless communication in accordance with the communication setting information of the first wireless communication stored in the memory unit, in response to the first wireless communication switching to the second wireless communication after commencing the first wireless communication, the communication setting information of the first wireless communication is stored in the memory unit and the first wireless communication is end, and in addition, the communication setting information of the second wireless communication is stored in the memory unit and the communication control unit controls to commence the second wireless communication in accordance with the communication setting information of the second wireless communication stored in the memory unit, and in response to the second wireless communication being turned off after commencing the second wireless communication, the communication control unit controls to commence the first wireless communication in accordance with the communication setting information of the first wireless communication.

7. The wireless communication device according to claim 1, wherein when the second wireless communication is turned off, the communication control unit deletes the communication setting information of the second wireless communication stored in the memory unit.

8. The wireless communication device according to claim 1, wherein the first wireless communication is a Wi-Fi communication, and the second wireless communication is a Wi-Fi Direct wireless communication.

9. The wireless communication device according to claim 1, further comprising a printing unit that prints in accordance with a printing data received by the first wireless communication or the second wireless communication.

10. A wireless communication device that performs a wireless communication with other wireless communication devices comprising:

a memory unit that stores a communication setting information used for the wireless communication; and a communication control unit that controls the wireless communication in accordance with the communication setting information stored in the memory unit so as to control a first wireless communication and a second wireless communication;

wherein the communication control unit controls the first wireless communication in accordance with a first communication setting information of the first wireless communication stored in the memory unit, when the first wireless communication is turned off and the second wireless communication is turned on, the first communication setting information of the first wireless communication is kept stored in the memory unit, the communication control unit controls the second wireless communication in accordance with a second communication setting information of the second wireless communication stored in the memory unit, when the second wireless communication is turned off and the first wireless communication is turned on, the communication control unit controls the first wireless communication in accordance with the first communication setting information of the first wireless communication kept storing in the memory unit, and the first wireless communication performs a wireless communication with the other wireless communication devices through an external access point, and the second wireless communication performs a peer-to-peer wireless communication with the other wireless communication devices through without the external access point.

* * * * *